(12) United States Patent
Dijkhof et al.

(10) Patent No.: US 7,603,495 B2
(45) Date of Patent: Oct. 13, 2009

(54) METHOD OF AND DEVICE FOR CHANGING AN OUTPUT RATE

(75) Inventors: Antonie Dijkhof, Eindhoven (NL); Maarten Alexander Ghijsen, Hilversum (NL); Simon Tony Dekker, Hilversum (NL)

(73) Assignee: IPG Electronics 503 Limited (GG)

( * ) Notice: Subject to any disclaimer, the term of this patent is extended or adjusted under 35 U.S.C. 154(b) by 381 days.

(21) Appl. No.: 10/511,367

(22) PCT Filed: Apr. 1, 2003

(86) PCT No.: PCT/IB03/01248

§ 371 (c)(1),
(2), (4) Date: Oct. 14, 2004

(87) PCT Pub. No.: WO03/090063

PCT Pub. Date: Oct. 30, 2003

(65) Prior Publication Data

US 2005/0235075 A1 Oct. 20, 2005

(30) Foreign Application Priority Data

Apr. 19, 2002 (EP) .................................. 02076544

(51) Int. Cl.
*G06F 13/00* (2006.01)
*G06F 3/00* (2006.01)

(52) U.S. Cl. .............................. 710/52; 710/56; 710/57
(58) Field of Classification Search ...................... None
See application file for complete search history.

(56) References Cited

U.S. PATENT DOCUMENTS

| 6,247,072 | B1 | 6/2001 | Firestone |
| 6,587,480 | B1 * | 7/2003 | Higgins et al. ............... 370/522 |
| 7,170,856 | B1 * | 1/2007 | Ho et al. ...................... 370/230 |
| 2003/0053416 | A1 * | 3/2003 | Ribas-Corbera et al. .... 370/233 |

* cited by examiner

*Primary Examiner*—Tariq R. Hafiz
*Assistant Examiner*—Scott Sun
(74) *Attorney, Agent, or Firm*—Volpe and Koenig, P.C.

(57) ABSTRACT

This invention relates to a method and system for changing an output rate of information for a buffer (3) with a constant first output rate (R1) which receives output data from a data source (2a), where the method step comprises; halting the reception of output data from the data source (2a); outputting (4) the stored output data of the buffer (3) at the first output rate (R1) until said buffer is empty, and resuming receiving and storing of output data in the buffer (3); setting a second constant output rate (R2) as the output rate of the buffer; and commencing/starting output of the content of the buffer at the second output rate (R2) when the amount of buffered data is equal to the second constant output rate (R2) times a requested buffer-time (TB2).

9 Claims, 2 Drawing Sheets

METHOD OF AND DEVICE FOR CHANGING AN OUTPUT RATE

This invention relates to a method of changing an output rate of information for a buffer where the buffer has a constant first output rate and receives output data from a data source, where the output data is added to be stored in said buffer.

The invention further relates to a device for changing an output rate of information for a buffer where the buffer has a constant first output rate and means for receiving output data from a data source, and means for adding and storing said output data in said buffer.

The processing of data in a data stream typically includes a data system for processing the incoming data stream. The data system usually consists of not only hardware, but also of software components to enhance its flexibility. The most cost-effective way to process a number of processes in a data system is to handle all processing in a single kernel, which is programmed to service the total number of tasks. To further optimize this, it is commonly used to let the system operate in a non-real-time mode. This however, may lead to limitations where one or more of the processes are time critical. If a non-real-time component executes a multiple of tasks and processes simultaneously, the data system will not generate a continuously flowing output data stream. The output will appear in bursts, so a constant output rate cannot be guaranteed.

Therefore, it is commonly known to introduce a hardware buffer for temporarily buffering the non-real-time data to tide over the time periods where the non-real-time component is not executing output data. Typically non-real-time implemented data source components comprise a software component.

When a data source component executes, it may consume and process an input signal and produce output data. The output data is added to the hardware buffer. This hardware buffer is emptied with a constant output rate to guarantee a steady flow of buffered data e.g. to simulate the desired appearance of a real-time system. By means of the hardware buffer, data may be outputted during the time when the data source component is not scheduled. The hardware buffer has to contain enough data to tide over the time till the next executing moment of the data source component.

After the data source component has executed, the produced data will reside a certain time period in the hardware buffer before it is outputted. The time of the data in the hardware buffer, which is equal to the delay of the data in the hardware buffer is typically called buffer time.

Typically, it is a goal to design the buffer time as short as possible without causing buffer underrun.

The definition of a buffer time is tb=B/R, where B is the amount of buffered data and R is the output rate.

In a variety of applications, it is highly unacceptable to have an output rate that is entirely static. In case of output rate increase, a problem may arise due to hardware buffer underflow, because the buffer time becomes less than the maximum time between consecutive execution moments of the data source component. In case of output rate decrease, the hardware buffer may introduce unacceptable delay before the data is outputted because the buffer time acquires an unacceptably high value and the data therefore resides a longer time period in the buffer.

Therefore, changing the output rate in an uncontrolled way results in an undefined or unwanted buffer time.

An object of the invention is to provide a method for changing an output rate of information for a buffer with a constant first output. That is, it is an object to provide a method, which solves the problem of the prior art.

This is achieved by a method of changing an output rate of information for a buffer with a constant first output rate where the buffer receives output data from a data source, and the output data is added to be stored in said buffer, the method comprising the steps of: specifying a second constant output rate and a requested buffer-time for said buffer; halting the reception of output data from the data source; outputting the stored output data of said buffer at said first output rate until said buffer is empty; resuming receiving and storing of said output data from the data source in said buffer when the buffer is substantially empty; setting a second constant output rate as the output rate of said buffer; and commencing/starting output of the stored content of said buffer at said second output rate when the amount of buffered data is substantially equal to the second constant output rate times the requested buffer-time.

In this way, a buffer with a constant output rate will be able to deliver different output rates in a controllable way thereby avoiding the above-mentioned drawbacks.

MPEG-2 Transport Streams usually have a constant bit rate; however, to optimize the data bandwidth, sometimes the bit rate might be adjusted. That makes this invention especially useful for real-time-broadcasted data such as TV and radio-shows.

For digital broadcasts, which require a type of processing due to compression techniques, this invention will introduce a minimum of delay i.e. as close to real time as possible. That is, the buffer length will be optimized each time the output rate is changed, so system latency will be as low as possible.

This invention relates e.g. to so-called pseudo-real-time applications, which make use of a buffer to level out a data flow, since true real-time applications do not conventionally have the need for any data buffering. However, true real-time systems, such as systems capable of convalescence data transferring comprising a type of buffer, may also benefit from this invention.

Embodiments of the method according to the invention are described in claims 2 to 7.

The object is further achieved by a device according to the preamble that is characterized in that the device comprises the means for halting/stopping the reception of output data from the data source; outputting the stored content of said buffer at said first output rate until said buffer is empty; stopping outputting of the content of said buffer, and resuming receiving and adding/storing output data from the data source when the buffer is substantially empty; setting the second constant output rate as the output rate of said buffer, and commencing/starting output of the stored content of said buffer at said second output rate when the amount of buffered data is equal to the second constant output rate times the requested buffer time.

Embodiments of the device according to the invention are described in claims 9 to 11.

The accompanying drawings illustrate the present invention by way of the embodiments in which:

FIG. 1 shows the processing data source (2a) with an input data source (1) in combination with a buffer (3) with a buffer data output bus (4). The data stream rate between the buffer (3) and buffer data output bus (4) is adjusted to a constant output rate (R1, R2), where the stream rate between the data source (2a) and input data source (1) only is limited by their respective capabilities.

The data source (2a) may be a non-real-time multi-threaded processing system, which means a processing system capable of performing a variety of jobs, tasks, threads etc. in a non time-critical action. Typical jobs for the data source in this environment could be controlling buffer size, calculating required processing overhead, processing input data, processing user data, etc. It may, however, not be required that the data source (2a) is multi-threaded.

The data source (2a) receives incoming data from an application (1) and performs the required data processing. The data source may estimate an optimal data rate for the currently processed incoming data. Subsequently, the data source (2a) may determine the potential need for changing a first output rate (R1) of the buffer by calculating a desirable buffer time in accordance with a required output rate (R2) and processing capabilities of the data source, etc.

Figure 2:
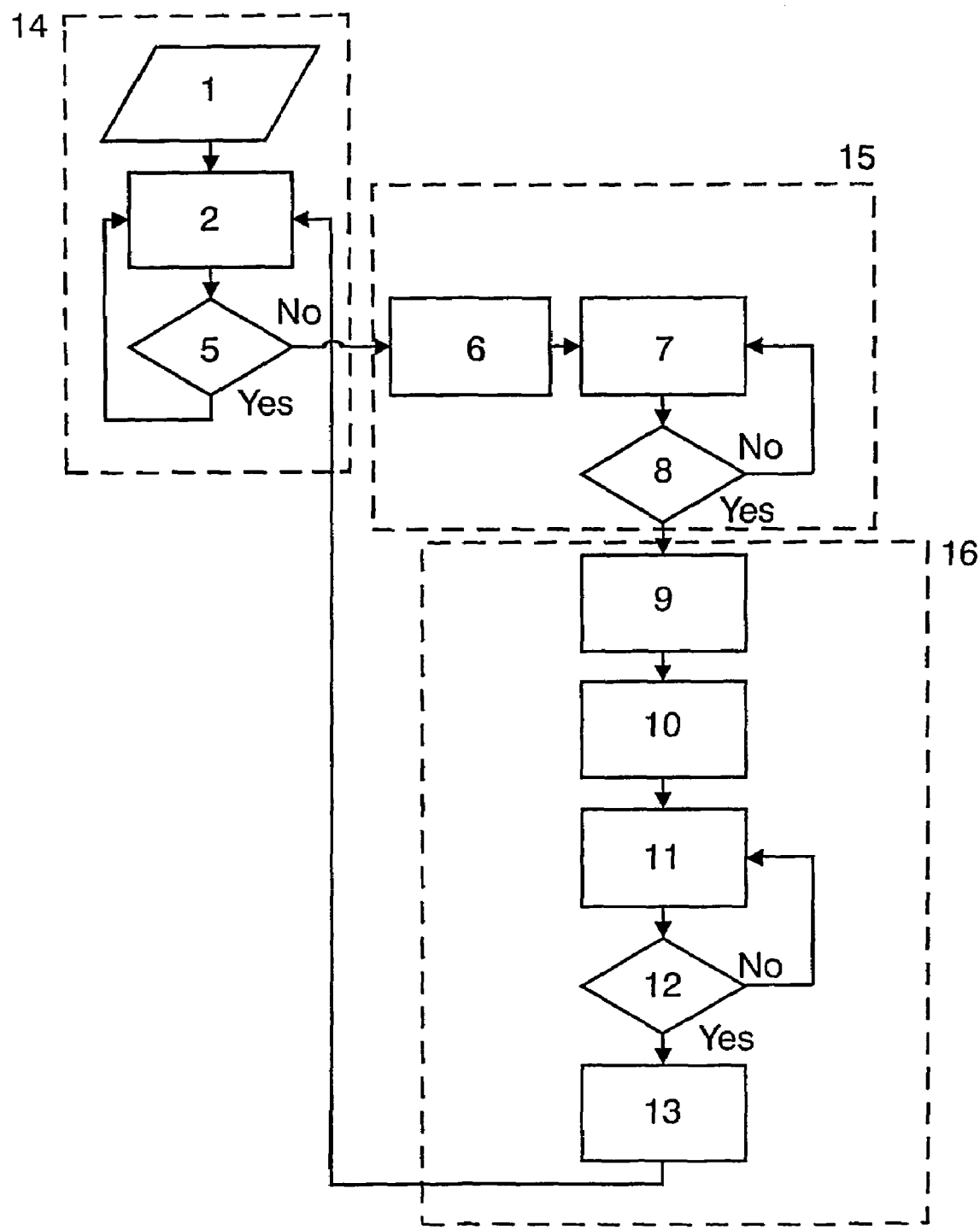
FIG. 2 illustrates execution of the three operation stages in a schematic block diagram.

A software-component of the data source (2a) will go through the following states to complete the output rate and/or buffer time change procedure:
1) When the software-component executes in a Normal Operation state (see (14) FIG. 2):
    a) The software-component consumes and processes the input data.
    b) The software-component produces output data (2b) and adds it to the hardware buffer.
    c) The hardware buffer is emptied with a constant output rate (R1) and the data is outputted (4).

In case a new setting for the output rate (R2) or a new buffer time (TB2) is found needed by comparing (5) current output rate (R1) and the requested output rate (R2), the software-component enters a Flush Output stage:
2) When the software-component executes and it is in the Flush Output state (see (15) FIG. 2):
    a) The software-component consumes and discards the input data.
    b) The software-component produces no output data (2b) and no data is added to the hardware buffer (3)
    c) The hardware buffer is emptied (7) with the old output rate (R1) and the data is outputted to the buffer output (4)

When the hardware buffer is empty (8), the software-component enters a Start New Output Rate state (see FIG. 2 (16)):
3) When the software-component executes and it is in the Start New Output Rate state:
    a) The software-component consumes and processes the input data.
    b) The software-component produces output data (2b) and adds it to the hardware buffer (3).
    c) The hardware buffer (3) is not emptied but the requested output rate (R2) is set.

When the amount of buffered data is substantially equal to the requested output rate times the requested buffer time (B=tb*R), the software-component enters the Normal Operation state again.

The main stages of the method operations according to the invention are illustrated in FIG. 2. The data source (2a) receives and processes input data (1), where the data processing may include data processing, error correction, etc.

As long as neither the required buffer time (TB2) nor output rate (R2) is changed compared to the current buffer time (TB1) and output rate (R1), the data source continues executing input data and producing output data (2b) to provide the buffer (3) with a necessary data flow. If the data source (2a) decides a new setting for the buffer time or output rate according to the currently processed data is required, the data source may be designed to enter the Flush Output stage (15).

As soon as the system enters Flush Output stage (15), the outputted data from the data source is stopped (6). The buffer is emptied (7, 8) with the output rate (R1) as long as there is data available in the buffer. Meanwhile, the incoming data source data (1) may be discarded to prevent the data from residing and accumulating in the data source (2a).

In case the buffer is empty, the system enters the Start New Output Rate state where the throughput of the buffer may be stopped (9), i.e. no data may leave the buffer (3).

During the Start New Output Rate state, a new output rate (R2) or buffer time (TB2) is defined. The requested output rate/buffer time is set (10) and the data source is resumed (11) to consume and process incoming data (1). The buffer throughput is halted until the buffer (3) is refilled (11, 12), where the buffer is defined to be refilled when the amount of buffered data equals requested output rate times requested buffer time (B=TB2*R2). When the amount of buffered data equals or substantially equals required buffer size (12), the system enters the Normal Operation state (14) again upon enabling the data throughput (13).

Figure 1:
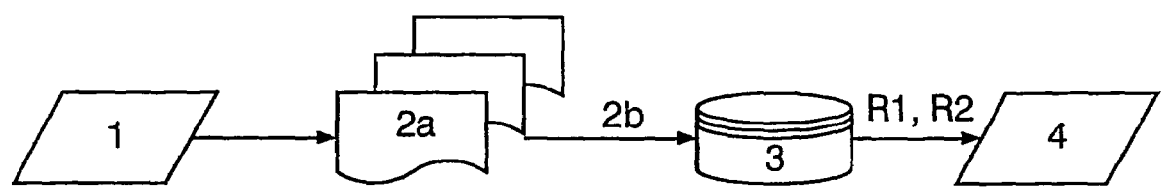
FIG. 1 shows an embodiment of the method according to the present invention.
Figure 3:
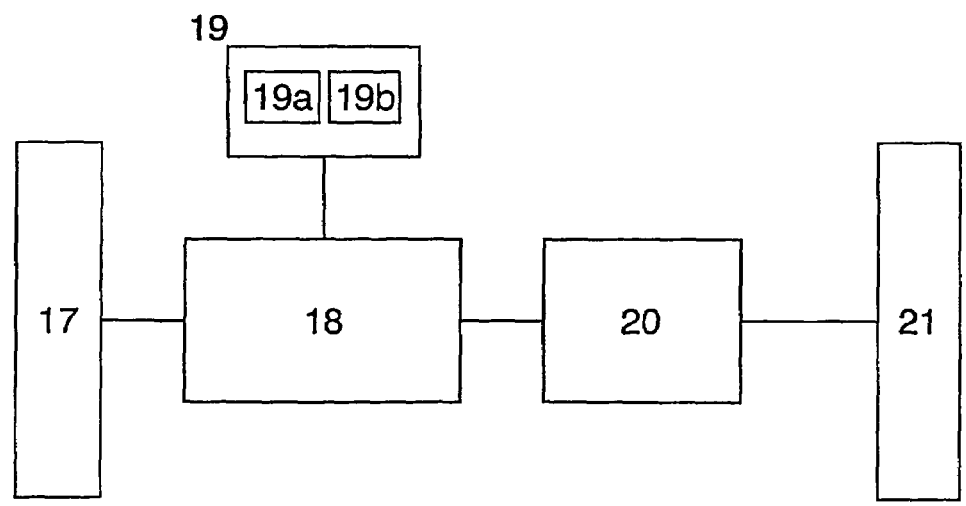
FIG. 3 illustrates an embodiment of the device according to the present invention.

FIG. 3 further illustrates an embodiment of the present invention comprising an input data source (17) to provide a system CPU (18) with data. The CPU (18) may comprise system memory storage (19) comprising software modules (19a, 19b) that are designed to perform the function of the means as mentioned within the claims. The data processed by means comprising the CPU (18) and a number of required software modules (19a, 19b) may be stored in the buffer (20) that may be controlled by way of said method as mentioned in the present invention. During emptying of said buffer (20) the output bus (21) may be the connecting link to further data processing applications.

The invention claimed is:

1. A method of changing an output rate of information for a buffer from a first constant output rate to a second constant output rate, where the buffer receives output data from a processing data source, and the output data is stored in the buffer, the method comprising:
   the processing data source halting the addition of output data to the buffer and discarding input data;
   outputting the stored output data of the buffer at the first output rate until the buffer is substantially empty;
   stopping outputting of the output data of the buffer;
   on the condition that the buffer is substantially empty, the processing data source resuming the addition of output data to the buffer, and the buffer resuming storing the output data;
   setting a second constant output rate as the output rate of the buffer; and
   commencing output of the stored output data of the buffer at the second output rate, when the amount of buffered data is substantially equal to the second constant output rate multiplied by a requested buffer time.

2. A method according to claim 1, wherein the processing data source specifies the second constant output rate and the requested buffer time.

3. A method according to claim 1, wherein the resuming of the addition of the output data and storing of the output data is initiated when the buffer is empty.

4. A method according to claim 1, wherein the
   processing data source is a software application adapted to receive and process input data and output the output data.

5. A method according to claim 1, wherein the buffer is a hardware buffer.

6. A method according to claim 1, wherein the output data are MPEG2 compliant elementary streams and the processing data source is adapted to multiplex the MPEG2 streams into a transport stream.

7. A computer readable storage medium including a set of instructions operable by a processor, the instructions comprising:
  a receive output data code segment for receiving output data from a processing data source into a buffer having a first constant output rate;
  an add and store output data code segment for adding and storing the output data in the buffer;
  a change output data code segment for changing the output rate of information from the buffer from the first constant output rate to a second constant output rate;
  a stop output data addition code segment for stopping the addition of output data by the processing data source to the buffer;
  a discard output data code segment for discarding of input data by the processing data source;
  an output data code segment for outputting the stored output data of the buffer at the first output rate until the buffer is substantially empty;
  a stop output data code segment for stopping outputting of the output data of the buffer;
  a resume output data code segment for resuming addition of output data by the processing data source to the buffer, and resuming storing the output data by the buffer;
  a set output data code segment for setting the second constant output rate as the output rate of the buffer; and
  a commence output data code segment for commencing output of the stored output data of said buffer at the second constant output rate, when the amount of buffered data is equal to the second constant output rate times a requested buffer time.

8. A computer readable storage medium according to claim 7, wherein the instructions further comprise a second constant output rate specification code segment for specifying the second constant output rate and the requested buffer time for the buffer.

9. A computer readable storage medium according to claim 7, wherein the instructions further comprise a resume specification code segment for resuming the addition of output data by the processing data source to the buffer, and resume storing the output data by the buffer when the buffer is empty.

* * * * *